United States Patent
Shi et al.

(10) Patent No.: US 8,830,548 B2
(45) Date of Patent: Sep. 9, 2014

(54) STACKED FILM THRESHOLD COMPONENT, DEVICE, AND METHOD OF MANUFACTURE

(75) Inventors: Xiaolei Shi, Schenectady, NY (US); Eugene Pauling Boden, Scotia, NY (US); Kwok Pong Chan, Troy, NY (US); Peter William Lorraine, Niskayuna, NY (US); Victor Petrovich Ostroverkhov, Ballston Lake, NY (US); Ri-an Zhao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 186 days.

(21) Appl. No.: 13/563,194

(22) Filed: Jul. 31, 2012

(65) Prior Publication Data

US 2014/0036328 A1   Feb. 6, 2014

(51) Int. Cl.
    *G03H 1/02*   (2006.01)
(52) U.S. Cl.
    USPC .......................................................... 359/3
(58) Field of Classification Search
    USPC .......................................................... 359/3
    See application file for complete search history.

(56) References Cited

U.S. PATENT DOCUMENTS

| | | | |
|---|---|---|---|
| 6,771,867 B2 | 8/2004 | Ishihara | |
| 7,388,695 B2 | 6/2008 | Lawrence et al. | |
| 7,848,031 B2 | 12/2010 | Hetzler et al. | |
| 2007/0072088 A1 | 3/2007 | Yumoto et al. | |
| 2008/0273441 A1 | 11/2008 | Van Der Tempel et al. | |
| 2009/0003177 A1 | 1/2009 | Tanabe | |
| 2010/0157774 A1 | 6/2010 | Ren et al. | |
| 2010/0157776 A1* | 6/2010 | Ren et al. | 369/103 |
| 2010/0165817 A1 | 7/2010 | Shi et al. | |
| 2010/0165819 A1 | 7/2010 | Shi et al. | |
| 2010/0182211 A1 | 7/2010 | Peters | |
| 2011/0103211 A1* | 5/2011 | Fujita et al. | 369/100 |
| 2011/0249334 A1 | 10/2011 | Merrill et al. | |

OTHER PUBLICATIONS

K. D. Singer et al., "Melt-processed all-polymer distributed Bragg reflector laser," Optics Express, vol. 16, No. 14, Jul. 7, 2008, pp. 10358-10363.

Y. Jin et al., "New Class of Bioinspired Lenses with a Gradient Refractive Index," Journal of Applied Polymer Sciences, vol. 103, 2007, pp. 1834-1841.

European Search Report and Written Opinion issued in connection with corresponding EP Application No. 13178075.1-1301 dated Nov. 20, 2013.

\* cited by examiner

*Primary Examiner* — Jade R Chwasz (74) *Attorney, Agent, or Firm* — Joseph J. Christian (57) ABSTRACT

A component includes a micro-hologram layer, where the micro-hologram layer includes layers inert to light interleaved with layers of functional film. The functional film layers are made of a material that undergoes a change in its refractive index when illuminated by a light beam, yet undergoes no change in its refractive index when illuminated by a different light beam. The components may further include interleaved spacer films with multiple micro-hologram layers and other elements (e.g., servo layer, coatings, and the like) so as to comprise a data storage device. Methods of manufacturing the component and device are also disclosed.

21 Claims, 6 Drawing Sheets

STACKED FILM THRESHOLD COMPONENT, DEVICE, AND METHOD OF MANUFACTURE

CROSS-REFERENCE TO RELATED APPLICATIONS

This application is related in parts to both commonly assigned, U.S. Application Ser. No. 13/459,840, entitled STACKED FILM OPTICAL DATA STORAGE DEVICE AND METHOD OF MANUFACTURE, filed on Apr. 30, 2012, and U.S. application Ser. No. 13/708,107, entitled STACKED FILM REFLECTIVE LAYERS FOR MULTI-LAYER OPTICAL DATA STORAGE, filed on Dec. 7, 2012, the entire contents of both which are incorporated by reference herein.

BACKGROUND OF THE INVENTION

The present invention relates generally to stacked film threshold components, devices that employ the components, methods of manufacturing the devices and/or the components, and, in particular embodiments, methods of recording and/or reading holograms on a device.

Micro-holographic data storage enables large numbers of data layers in a single disc to achieve high data capacity. In each of the data layers, digital data "0" or "1" is represented by a presence or absence of a micro-hologram. The micro-hologram functions as a local reflector upon readout beam illumination. Presence or absence of a micro-hologram provides a "high" or "low" reflected signal that provides stored information.

Optical recording of a micro-hologram requires two counter-propagating focused coherent laser beams from both sides of the disc with overlapping focal regions. Interference of the two beams at the focal region induces local changes of the material that results in a refractive index modulation pattern, which is the micro-hologram. Good alignment of these two beams typically requires a five-axis servo system during dynamic recording. In addition, recording at all the layers through the depth of the disc requires a well aberration compensated optical system, which is very challenging at high numerical aperture. Therefore, both the optics and servo system are much more complicated and expensive than what are required in conventional optical drive systems where only a single focused beams is used for recording and/or readout.

The concept of "pre-format" was proposed to overcome this issue. (See e.g., U.S. Pat. No. 7,388,695). In this scheme, blank discs are "pre-formatted" with the micro-hologram layers before being used in an optical drive. This "pre-format" step is one of the steps in disc manufacturing. The preformatted discs are then used in an optical drive for recording and readout. The recording is done through erasure or modification of the micro-holograms using a single focused laser beam.

The system for "pre-formatting" is a high quality expensive dual-side micro-hologram recording system.

Accordingly, there is an ongoing opportunity for improving upon existing optical data storage structures, methods of manufacture, methods of formatting, and/or methods for recording.

BRIEF DESCRIPTION

The present invention overcomes at least some of the aforementioned drawbacks by eliminating the need to pre-format data storage devices. More specifically, the present invention is directed to providing a stacked film threshold component, device, and methods of manufacture.

Therefore, in accordance with one aspect of the invention, a component comprises a micro-hologram layer, wherein the micro-hologram layer comprises a plurality of layers inert to light interleaved with a plurality of functional film layers, wherein the plurality of functional film layers comprise a material that undergoes a change in its refractive index when illuminated by a first light beam and undergoes no change in its refractive index when illuminated by a second light beam.

In accordance with another aspect of the invention, a method of manufacture comprises providing a functional film material that undergoes a change in its refractive index when illuminated by a first light beam and undergoes no change in its refractive index when illuminated by a second light beam; providing a material inert to light; extruding the functional film material and the material inert to light through a multiplier die, thereby forming a micro-hologram layer; providing a spacer film; and adhering the spacer film and the micro-hologram layer, thereby forming a component.

In accordance with another aspect of the invention, a method of manufacture comprises: providing a thin spacer film, via a roll-to-roll system; applying a plurality of coatings to the thin spacer film, wherein the plurality of coatings comprise: a functional material that undergoes a change in its refractive index when illuminated by a first light beam and undergoes no change in its refractive index when illuminated by a second light beam; and an inert material; curing the thin spacer film and the plurality of coatings thereby creating a micro-hologram layer.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %" is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

As used herein, the term "non-linear sensitizer" refers to a material that has a sensitivity having dependence to the light intensity, that is, the sensitivity is high at the higher (recording) intensity and low at the lower (readout) intensity.

As used herein, the term "sensitivity" is defined as the amount of index change obtained with respect to the amount of fluence used to irradiate a spot of the film with the laser light. In general, sensitivity for linear materials and/or linear sensitizers does not change over a variety of intensities.

As used herein, the term "fluence" means the amount of optical beam energy that has traversed a unit area of the beam cross-section (measure, for example, in Joule/$cm^2$), while the term "intensity" means optical radiative flux density, e.g., amount of energy traversing a unit area of beam cross-section in unit time (measure in, for example, Watt/$cm^2$).

As used herein, the term "latent acid generator" refers to a material capable of generating acid or proton when exposed to a stimulus.

As used herein, the term "reactant" refers to a material capable of undergoing a chemical change to form a "product", which results in modulation of refractive index change within the medium.

As used herein, the term "latent chromophore" refers to a material capable of generating a chromophore in response to a stimulus. Further, the term "latent chromophore" refers to a material capable of generating a chromophore, which has an absorption or optical characteristics different from the latent chromophore.

As used herein, the term "change" is meant to include any indirect photochemical reaction of the reactant, e.g., photodimerization or isomerization. The use of the word "indirect" with terms such as photodimerization or photochemical reaction or photoreaction means that the reactant did not receive the energy directly from absorption of a photon, but rather from another molecule (such as, e.g., a sensitizer or mediator) that first absorbed the photon and then transferred a portion of that energy to the reactant that subsequently underwent dimerization.

As used herein, the term "no change" in reference to change in a refractive index is meant to include a material or combination of materials that have change of less than about 0.05% change in its refractive index over a duration of time.

Aspects of the present invention have been shown to offer advantages over previous data storage components, devices and methods of manufacture. Aspects of the present invention aim to simplify the manufacturing steps and the structure of such manufactured data storage devices so as to eliminate the need to pre-format the devices. An aspect of the present invention is to use a stacked periodic film structure so as to create a "reflective" layer, or termed a "micro-hologram layer" at light beam illumination. This reflective layer may contain threshold material that can be modified so as to modify (reduce or increase) the reflectivity of the layer under recording beam illumination. As a result, the need to provide a highly complex "replication" system is effectively eliminated and existing optical systems are fully compatible with the data storage devices discussed herein. In embodiments, the data storage device of the present invention may be used with single-sided low cost optical drives for "recording" and "readout", which eliminates the need for expensive and complicated "pre-formatting" systems to make micro-holograms in a disc.

Figure 1:
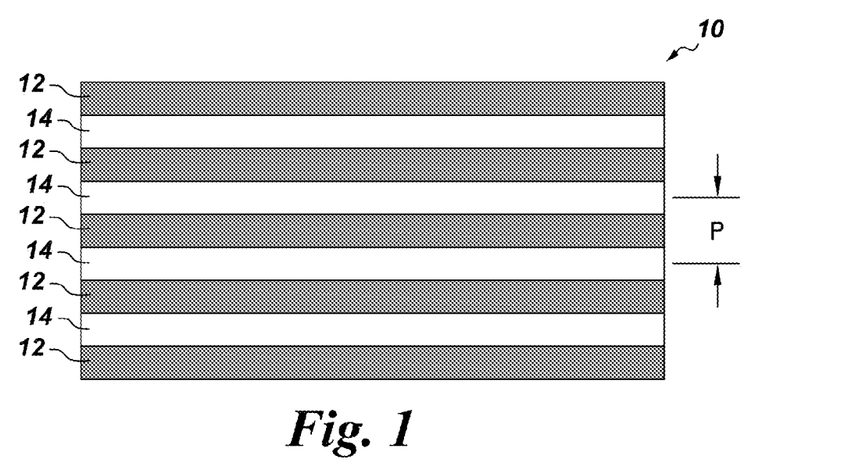
FIG. 1 is a sectional elevation view of a portion of a stacked film threshold component, according to an embodiment of the present invention.

Referring to FIG. 1, a sectional elevation view of a portion of a component, according to an embodiment of the present invention, is shown. The stacked film threshold component, or component, depicted as 10, may comprise a plurality of layers inert to light 14 interleaved with a plurality of functional film layers 12. Collectively, as will be discussed in more detail herein, the layered construct 10 may also be deemed a micro-holographic layer 10.

The term adjoining as used herein means either the two, or more, elements are in physical contact with each other or there may be an interstitial layer(s) therebetween the two, or more, elements. That is the two, or more, elements are joined in some fashion so as to result in a single construct.

Despite the quantity of elements shown in FIG. 1, the micro-hologram layer 10 may comprise a quantity of functional film layers 12 that may be in a range of 2 to 20. Similarly, a quantity of layers inert to light 14 may too be in a range of 2 to 20.

The functional film layer 12 may comprise a material or combination of materials that undergoes a change in its refractive index when illuminate by a light beam at a high intensity and undergoes no change in its refractive index when illuminated by a light beam at low intensity.

The term "high intensity" as used herein includes light in a range from about 50 MW/$cm^2$ to about 500 MW/$cm^2$. The term "low intensity" as used herein includes light in a range from 0.1 MW/$cm^2$ to about 30 MW/$cm^2$.

The functional film 12 may comprise any suitable combination of polymers, non-linear optical dyes, sensitizers, and material capable of undergoing a refractive index change. Examples of suitable functional film 12 materials include, but are not limited to, those listed in commonly assigned U.S. Pat. No. 8,124,299, Ser. No. 12/551,410, entitled "Methods For Using Optical Data Storage Media"; US Patent Pub. No. 2012/0052232, Ser. No. 12/873,024, entitled "Use of Appended Dyes In Optical Data Storage Media"; US Patent Pub. No. 2011/0053055, Ser. No. 12/551,455, entitled "Compositions, Optical Data Storage Media and Methods for Using the Optical Data Storage Media"; and, U.S. Ser. No. 13/164,996, entitled "Method of Recording Data in an Optical Data Storage Medium and an Optical Data Storage Medium". All of the aforementioned documents are hereby incorporated by reference in their entirety.

In one embodiment the functional film 12 may comprise a thermoplastic polymer matrix; a non-linear sensitizer capable of absorbing incident radiation having a wavelength and an intensity sufficient to cause upper triplet excitation; a latent acid generator capable of generating an acid upon triplet excitation from the non-linear sensitizer and being substantially non-responsive to said incident radiation; a reactant including a latent chromophore, wherein at least one latent chromophore is capable of forming at least one chromophore by reacting with the acid generated, thereby causing a refractive index change in the optical data storage medium. In another embodiment, the functional film 12 may comprise a thermoplastic polymer matrix; a latent acid generator; a non-linear sensitizer; and a reactant including a latent chromophore. In another embodiment, the functional film 12 may comprise a thermoplastic polymer matrix; a latent acid generator; a non-linear sensitizer; and, a reactant comprising a protected benzophenone.

In another embodiment the functional film 12 may comprise a polymer matrix; a reactant capable of undergoing chemical change upon triplet excitation ($T_n$; n>1), thereby causing a refractive index change; and, a non-linear sensitizer comprising one or more subphthalocyanine (sub-PC) reverse saturable absorbers (RSAs) capable of absorbing actinic radiation at 405 nm to cause upper triplet energy transfer to said reactant.

In another embodiment the functional film 12 may comprise a polymer matrix; a reactant capable of undergoing a photochemical change upon excitation, thereby causing a refractive index change; and, a non-linear sensitizer capable of causing excitation of the reactant when the reactant is exposed to one or more wavelengths of radiation, wherein the non-linear sensitizer is chemically bonded to the polymer matrix.

In another embodiment the functional film 12 may comprise a polymer matrix; a reactant capable of undergoing a photochemical change upon triplet excitation to form a product, thereby causing a refractive index change in the medium; and, a non-linear sensitizer comprising one or more platinum ethynyl complexes capable of absorbing actinic radiation at 405 nm to cause upper triplet energy transfer to said reactant.

Similarly, the layers inert to light 14 may comprise any suitable material. The layer inert to light 14 may comprise any suitable material that is either inert to light or about inert to light. Examples of suitable polymers for use in the polymer matrix for the layer inert to light 14 include, but are not limited to, poly(alkyl methacrylates), such as poly(methyl methacrylate) (PMMA), polyvinyl alcohols, poly(alkyl acrylates), polystyrenes, polycarbonates, poly(vinylidene chloride), poly(vinyl acetate), combinations thereof, and the like.

As shown in FIG. 1, P, is shown as a period of a micro-hologram layer 10 and is defined in Eq. 1 as:

$$P = \lambda/2n \quad \text{Eq. 1}$$

wherein λ is a light wavelength of a readout light beam and n is an effective refractive index of the plurality of inert film layers 14 and functional film layers 12 in the micro-hologram layer 10. As constructed of the plurality of layers inert to light 14 and functional film layers 12, a thickness of the micro-hologram layer 10 is in a range from about 0.5 μm to about 10 μm.

Figure 2:
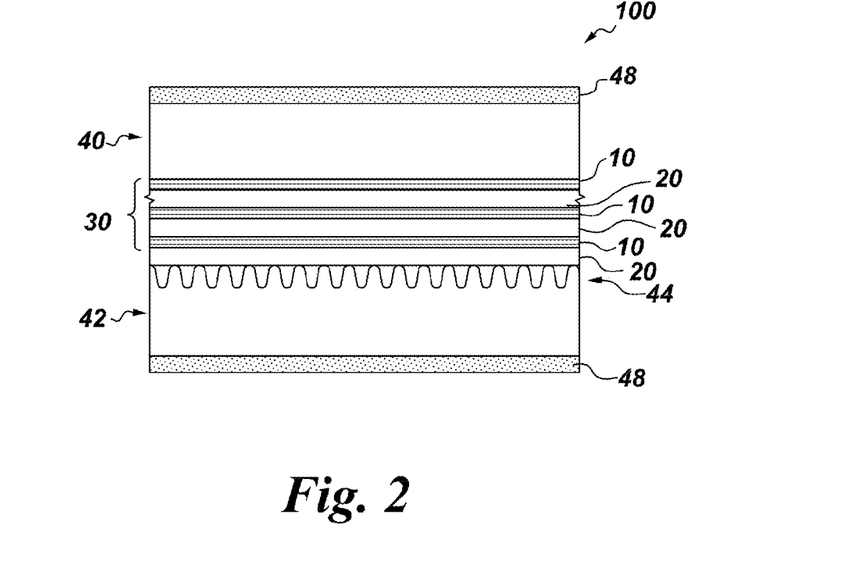
FIG. 2 is a sectional elevation view of a portion of a stacked film threshold device, according to an embodiment of the present invention.

Referring to FIG. 2, a sectional elevation view of a portion of a data storage device, and data storage device component, according to an embodiment of the present invention, is shown. The data storage device, depicted as 100, includes a data storage device component 30 and other elements.

The data storage device component 30 comprises a plurality of micro-hologram layers 10 interleaved with a plurality of spacer films 20. The plurality of spacer films 20 may comprise a material inert to light. Each of the plurality of spacer films 20 may have thickness from about 20× to about 100× of Rayleigh range. The Rayleigh range is determined by numerical aperture and light wavelength of readout device.

The spacer films 20 may comprise any suitable material. Examples of suitable polymers for use in the polymer matrix for the spacer film 20 include, but are not limited to, poly(alkyl methacrylates), such as poly(methyl methacrylate) (PMMA), polyvinyl alcohols, poly(alkyl acrylates), polystyrenes, polycarbonates, poly(vinylidene chloride), poly(vinyl acetate), combinations thereof, and the like.

The data storage device 10 comprises a substrate layer 40 with the data storage device component 30 adjoined thereto. As shown adjoining a second side of the data storage device component 30 may be a second substrate layer 42. The second substrate layer 42 may further include a servo layer 44 therein.

The data storage device 100 may further include a suitable barrier coating 48 on one, or both, sides of the device 100. Any suitable material may be used, now known or later developed, for the barrier coating 48. Further, the data storage device 100 may include one, or more, of an anti-scratch coating and an anti-reflection coating. Although the anti-scratch coating and/or the anti-reflection coating may be placed on both sides of the data storage device 100, typically these coatings are only applied on the upper side of the data storage device 100, as the upper side is the side from which read and/or writing actions are conducted on the data storage device 100.

As a result, the data storage device 100 of the present invention may ultimately be configured so as to function as a micro-holographic data storage device. In an embodiment the micro-holographic data storage device may comprise a disc. Suitable discs may include, but are not limited to, standard disc sizes, such as a disc having a total thickness of about 1.2 mm or about 100 μm (i.e., "flexible disc"). However, the disc may be constructed to any total thickness including a range from about 100 μm to about 1.2 mm including, for example, discs having a total thickness of 100 μm, 400 μm, 600 μm, or 1200 μm, and the like.

The substrate layers 40, 42 may comprise a moldable non-photopolymer plastic substrate. Particular examples of suitable polymers for use in the polymer matrix for the substrate layers 40, 42 include, but are not limited to, poly(alkyl methacrylates), such as poly(methyl methacrylate) (PMMA), polyvinyl alcohols, poly(alkyl acrylates), polystyrenes, polycarbonates, poly(vinylidene chloride), poly(vinyl acetate), combinations thereof, and the like. The substrate layer 42 may further include a servo layer 44 therein that comprises grooves, or groove layer and a dichroic layer on the groove layer.

Examples of suitable substrate layers 40, 42, servo layer 44, groove layer, dichroic layer are discussed in the following references, but are not limited to, those materials listed in commonly assigned US Patent Pub. No. 2011/0080823, Ser. No. 12/966,144, entitled "Disc Structure For Bit-Wise Holographic Storage"; and, U.S. Pat. No. 8,194,520, Ser. No. 12/346,378, entitled "Disc Structure For Bit-Wise Holographic Storage". Both documents are hereby incorporated by reference in their entirety.

Figure 3A:
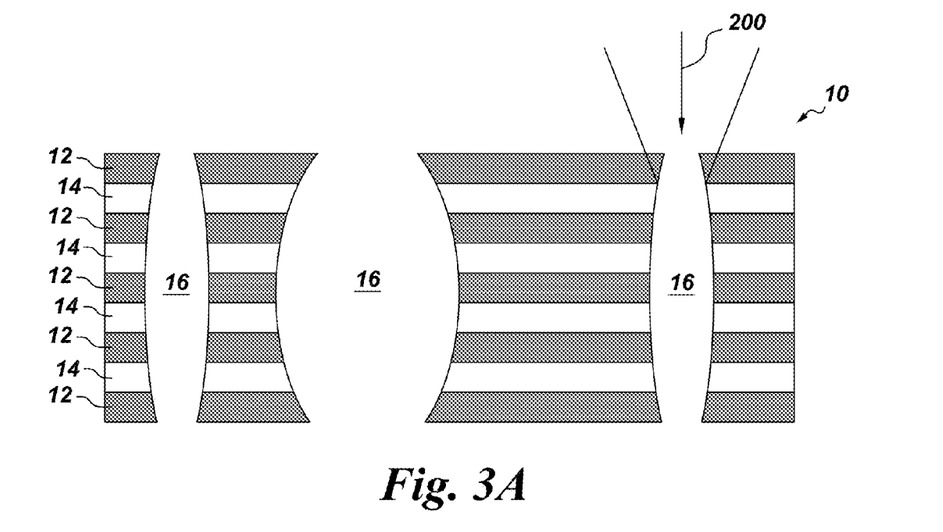
FIGS. 3A and 3B are sectional elevation views of a portion of a stacked film threshold component undergoing recording, according to an embodiment of the present invention.
Figure 3B:
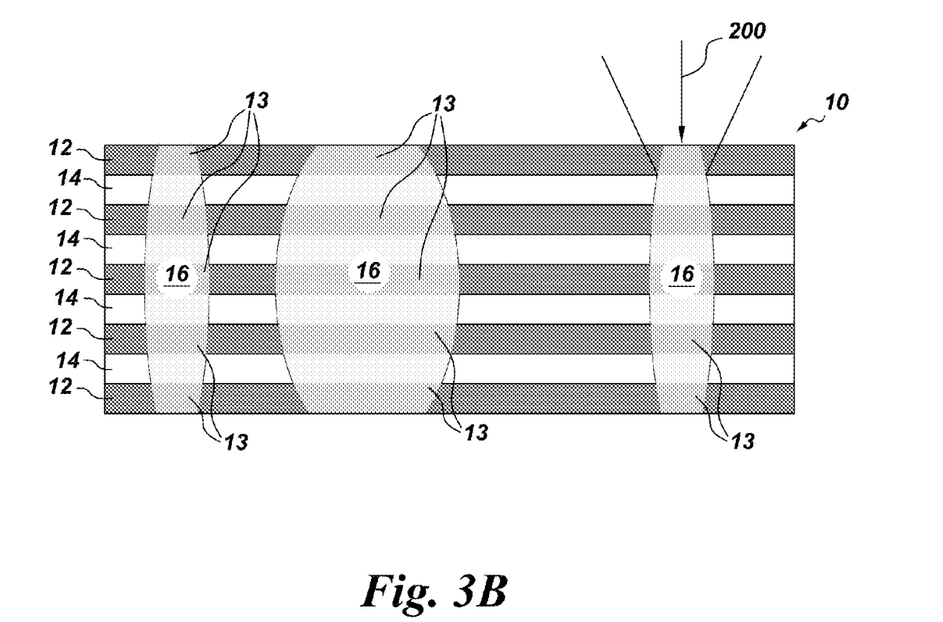

Referring to FIGS. 3A and 3B, a focused recording laser beam 200 is shown recording a hologram 16 on a portion of a micro-holographic layer 10 within a data storage device 100 (not shown). FIG. 3A depicts a recording in the micro-holographic layer 10 by erasure; and, FIG. 3B depicts a recording in the micro-holographic layer 10 by modification.

As shown, the materials in the two layers 12, 14 comprise two different materials wherein one material is functional and the other material is inert. It should be noted that both layers 12, 14 could comprise functional materials, wherein the functional materials are not the same material and the change in refractive index moves in opposite directions for both simultaneously upon exposure, which would produce enhanced contrasts and potentially larger changes in reflectivity. As discussed the functional layer 12 comprises a functional material that has a threshold response to light at recording wavelength (e.g., functional layer 12 changes its refractive index when illuminated by the light beam 200 during a recording condition (i.e., high intensity) and has no change in its refractive index during a readout condition (i.e., low intensity). As shown, during recording the functional material 12 changes its refractive index to be closer to (see FIG. 3B), or the same as (see FIG. 3A), the refractive index of the adjacent inert material 14. In this manner, upon a recording condition, the reflectivity of at least one of the plurality of micro-hologram layers 10 in the data storage device 100 is effectively reduced. The absolute index change of the plurality of micro-hologram layers 10 may be in a range from about 0.001 to about 0.05.

In another embodiment, during recording the functional material 12 changes its refractive index to be farther from the refractive index of the adjacent inert material 14. In this manner, upon a recording condition, the reflectivity of at least one of the plurality of micro-hologram layers 10 in the data storage device 100 is effectively increased. In addition, the recording light wavelength may be different from the reading light wavelength.

Various embodiments may have various configurations without departing from aspects of the present invention. For example, although the figures show uniform thickness of the spacer film 20, different spacer films 20 may have different thicknesses within the data storage device component 30. For example, a first spacer film 20 may have a different thickness that a second spacer film 20. The first spacer film 20 may or may not be adjoining within the data storage device component 30.

Similarly, the plurality of spacer films 20 and the plurality of layers inert to light 14 in the micro-hologram layers 10 may or may not comprise the same material depending on the embodiment. The plurality of spacer films 20 and the plurality of layers inert to light 14 may have the same refractive index.

Depending on the particular embodiment, a quantity of micro-hologram layers 10 with in the data storage device component 30 may be from 2 to 50. Depending on the quantity and thicknesses of the micro-hologram layers 10 and spacer films 20 interleaved therebetween in the data storage device component 30, a thickness of the data storage device component 30 may be in a range from about 20 μm to about 500 μm.

Figure 4:
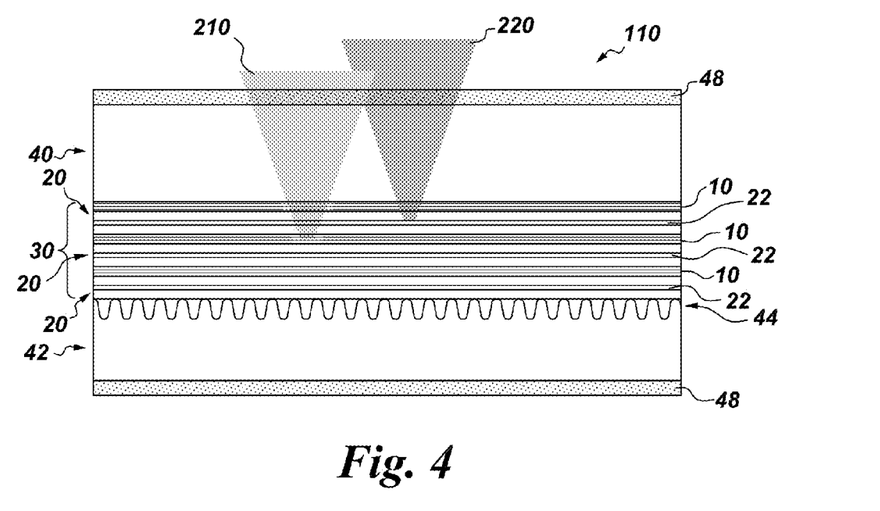
FIG. 4 is a sectional elevation view of a portion of a stacked film threshold device, according to another embodiment of the present invention.

Referring to FIG. 4, an elevation view of another embodiment of a data storage device 110 is depicted. In this embodiment, the spacer film 20 further includes layered construct 22, deemed an auxiliary reflective stack, that comprises a plurality of layers comprised of material inert to a recording and reading light wavelength(s), thereby defining a reflecting reference layer.

The auxiliary reflective stack 22 may comprise at least two materials inert to the recording and reading light wavelength (s). In this manner, the auxiliary reflective stack 22 may be designed to serve as a permanently reflecting reference layer so as to assist beam positioning within the depth of the disk (e.g., focusing reference). The spacing may be made such that the high reflectance wavelength is the same as the data beam 210, allowing for the same or secondary beam of the same color to track the reference surface. Alternatively, the spacer stack 20, 22 may operate at a different wavelength to utilize a different color dedicated tracking, or reference, beam 220.

Figure 5:
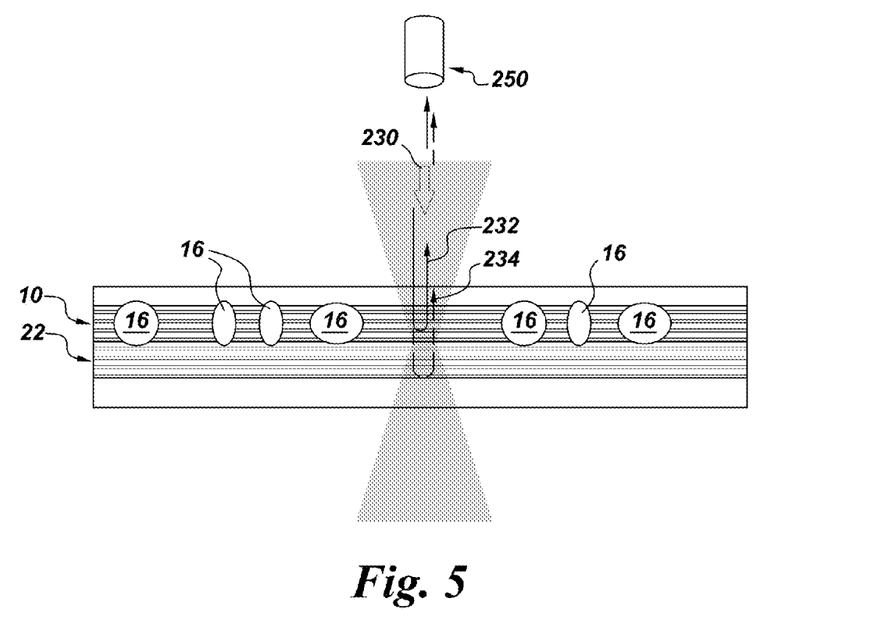
FIG. 5 is a sectional elevation view of a portion of the stacked film threshold component of FIG. 4 undergoing homodyne detection, according to another embodiment of the present invention.

Referring to FIG. 5, an elevation view of another embodiment of portion of a data storage device is depicted. The embodiment shown allows for a single detector 250 and read beam 230 so as to allow a reference beam to allow for homodyne detection. In this embodiment, a spacer auxiliary reflective stack 22 with the spacer film 20 is used that operates at the same wavelength as the read beam 230. In this manner, the auxiliary reflective stack 22 may be place closer to the microhologram layer 10 so as to provide a constant coherent reflection 234 that can be mixed on the detector 250 with the modulated reflection 232 from the recordable micro-hologram layer 10 having modified holograms 16 therein. As a result, the two reflections 232, 234 interfere and provide signal enhancement via a homodyne effect.

Although various figures may depict a data storage structure 100 that includes a single type of functional film 12, in other embodiments of the invention, different materials may be used in different functional films 12 in a particular micro-hologram layer 10 and/or between different micro-hologram layers 10. For example a first functional film 12 may be comprised of a first material and the second functional film 12 may be comprised of a second material, such that the first and second materials are sensitive to different wavelengths. The first functional film 12 may be of any quantity. The second functional film 12 may also be of any quantity. Similarly, the order and combination of functional films 12 in the particular micro-hologram layer 10 and/or between different micro-hologram layers 10 within the data storage device 100 that have the same and/or different materials is nearly limitless in various embodiments. For example, the data storage device component 30 may comprise a plurality of functional films 12 such that there is a first set of functional films 12 that are sensitive to light having a wavelength of $\lambda_1$; there is a second set of functional films 12 that are sensitive to light having a wavelength of $\lambda_2$; and, there is third set of functional films 12 that are sensitive to light having a wavelength of $\lambda_3$, such that $\lambda_1 \neq \lambda_2 \neq \lambda_3$. This configuration may be arranged in a multitude of combinations within the data storage device 100. For example, the data storage device component 30 may include three different material functional film sets 12 wherein the first material film set 12 (e.g., $\lambda_1$) is located at or near the top region of the data storage device component 30; the second material film set 12 (e.g., $\lambda_2$) is located at or near the middle region of the data storage device component 30; and, the third material film set 2 (e.g., $\lambda_3$) is located at or near the bottom region of the data storage device component 30. In another embodiment, the data storage device component 30 may include a repeating-type configuration of functional films 12 with the different wavelength materials used. For example, at or near the top of the data storage device component 30 may be a micro-hologram layer 10 with functional film 12 of a material sensitive to light at $\lambda_1$, while in the next immediate micro-hologram layer 10 with functional film 12 below is a material sensitive to light at $\lambda_2$, and then in the still next below micro-hologram layer 10 is functional film 12 with a material sensitive to light at $\lambda_3$. This three-material "pattern" may then be repeated in successive three-group sets of micro-hologram layers 10 down through the data storage device component 30. Clearly, other combination and quantities of different material for use as the functional film 12 can be used than those discussed herein.

An advantage of employing functional films 12 having different materials with different wavelength sensitivities is that the data storage device 100 may then be used with a data reader and/or read/write device (not shown) such that different readers or devices may be used so that, for example, only one set of the multiple sets of micro-hologram layers 10 may be writeable or readable in the particular instance. So, for example, in the application of medical records, a data storage device 100 having an embodiment with the multiple materials for the functional films 12 may be configured such that the set of functional films 12 of the first material (e.g., $\lambda_1$) may be readable and/or writeable only by a medical patient; yet the set of functional films 12 of the second material (e.g., $\lambda_2$) may be readable and/or writeable only by a treating physician and/or physician's staff; and, finally the set of functional films 12 of the third material (e.g., $\lambda_3$) may be readable and/or writeable only by a medical equipment manufacturer. Clearly, other combination and quantities of different material for use as the functional film 12 can be used than those discussed herein.

Figure 6:
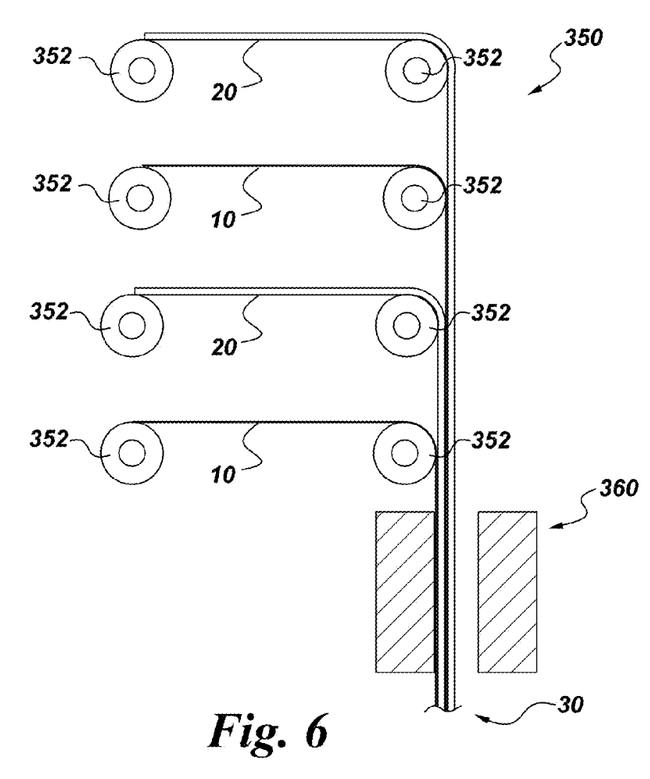
FIG. 6 is a schematic diagram of a system that employs a method of manufacture of a stacked film threshold component, according to an embodiment of the present invention.
Figure 8:
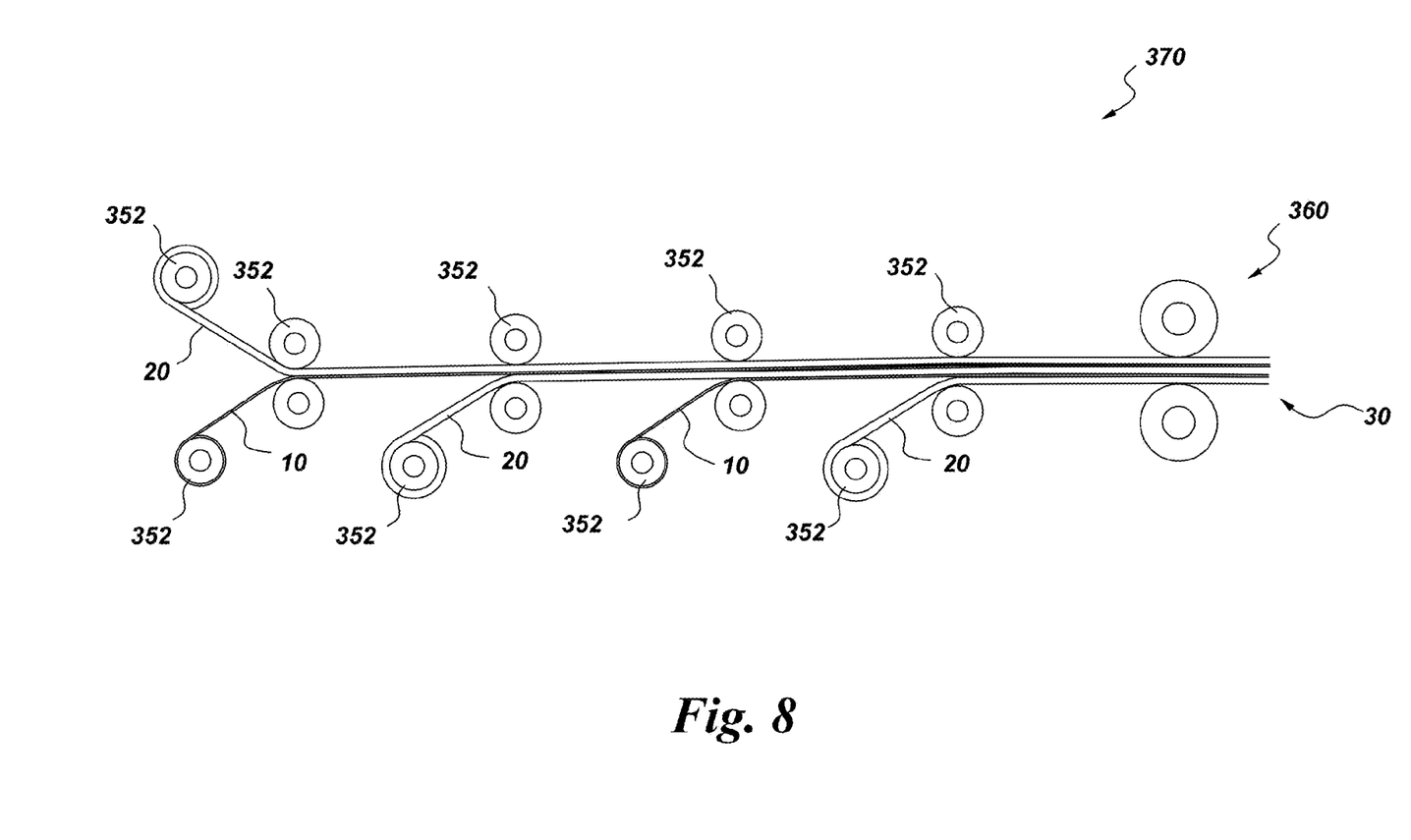
FIG. 8 is a schematic diagram of a system that employs a method of manufacture of a stacked film threshold component, according to another embodiment of the present invention.
Figure 9:
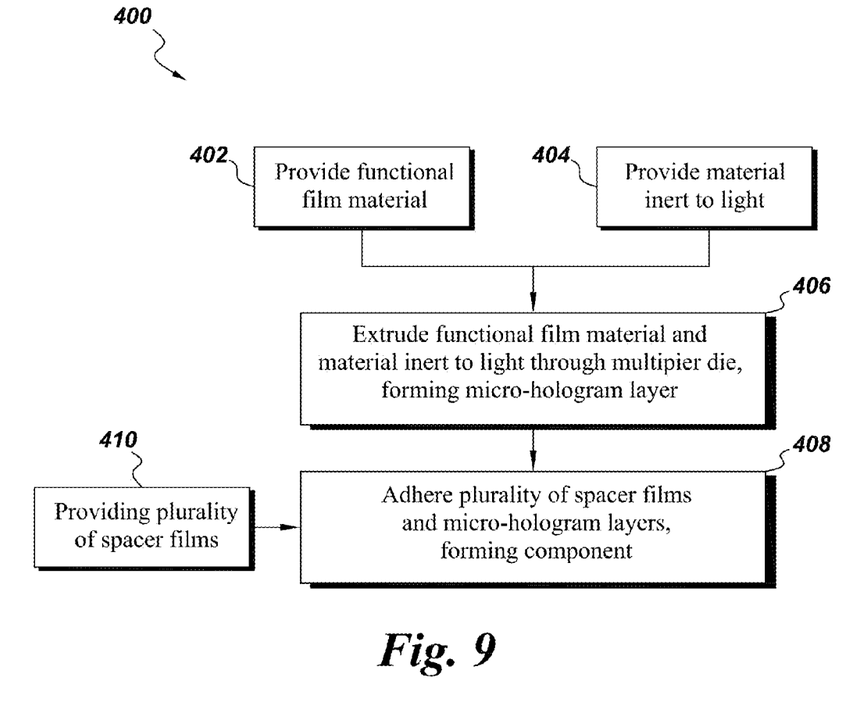
FIG. 9 is a flowchart of a method of manufacturing a stacked film threshold component, according to an embodiment of the present invention.

Referring now to FIGS. 6 and 8, schematic diagrams of various systems that employ methods of manufacture of a data storage device component, according to embodiment of the present invention are shown. Additionally, FIG. 9 depicts a flowchart depicting one method of manufacture of a component that the two systems in FIGS. 6 and 8 may employ. FIGS. 6 and 8 show portions of systems 350, 370, respectively. The systems 350, 370 may employ a plurality of rollers 352 and other known elements (not shown) and an adhering device 360 to construct at least the micro-hologram layer 10 portion of a data storage device component 30 as discussed. Any suitable adhering device 360 may be used including a thermal press (see e.g., FIG. 6), a hot roll lamination device (see e.g., FIG. 8), an optical curing agent, and the like.

This method may include the use of layer multiplication coextrusion techniques that can achieve hundreds to thousands of layers. This process generally comprises the coextrusion of two separate polymers that pass through a series of dies that split the stream vertically and spread it horizontally going into the next die. Thus, the initial 2 layer multiplies into $2^{n+1}$ layers to a maximum of 2048 layers with individual layers <10 nm thick [See reference: Y. Jin, H. Tai, A. Hiltner, E. Baer, James S. Shirk, Journal of Applied Polymer Science, Vol. 103, 1834-1841 (2007).] This technique has been used to make an all polymer melt-processed distributed Bragg reflector laser with layer thicknesses and spacing similar to those required in aspects of the present invention. [See reference: Kenneth D. Singer, Tomasz Kazmierczak, Joseph Lott, Hyunmin Song, Yeheng Wu, James Andrews, Eric Baer, Anne Hiltner, and Christoph Weder, OPTICS EXPRESS 2008, Vol. 16, No. 14, 10360]. Thus, the micro-hologram layer, or component, 10 (e.g., layers 12, 14) could be made in a single pass (e.g., making a plurality of thin functional film extrusions 12, 14) and adhered to spacer layer 20 at the end of the process to produce a structure 30 that comprises film of 10 and 20 which could be stacked separately to make the data storage device 100. In other embodiments, multiplication coextrusion techniques have also included 3-layer coextrusion so the entire stack 30 could potentially be made in a single pass and used to later make the data storage device 100.

The method, as shown in FIG. 9 as 400, may comprise providing a functional film material that undergoes a change in its refractive index when illuminated by a first light beam and undergoes no change in its refractive index when illuminated by a second light beam at 402. Similarly, a material inert to light is provided at 404. At 406, the functional film material and material inert to light is extruded through at least one multiplier die, thereby forming the micro-hologram layer 10. At 410, a plurality of spacer films 20 is provided. Then at 408 a plurality of micro-hologram layers and the plurality of spacer films are adhered together, thereby forming a component 30.

In other embodiments, the micro-hologram layer 10 and/or components thereof may also be processed through a variety and combination of film roller drum(s) and/or thermal press (es), so as to form a sheet. Additionally, in an embodiment the plurality of micro-hologram layers 10 and the plurality of spacer films 20 are transported and aligned, via the roll-to-roll systems 350, 370 shown in FIGS. 6 and/or 8. The component 30 that results is such that a micro-hologram layer 10 is located between two of the plurality of spacer films 20. The adhering may be provided by the adhering device 360 or similar.

Other aspects in the method may include, but are not limited to, further adhering the component 30 to one or more substrate layers, wherein the substrate layer comprises a non-photopolymer plastic substrate and a servo layer therein, thereby defining a data storage device. The device may further be cut to a predefined size and shape, so as to define a suitable data storage disc. Additional coating(s) may be applied to one or both surfaces of the disc including a barrier coating, an anti-reflection coating, and an anti-scratch coating. The barrier coating typically is applied to both sides of the disc, while the anti-reflection coating, and the anti-scratch coating are merely applied to one side (the read/write side) of the disc.

Figure 7:
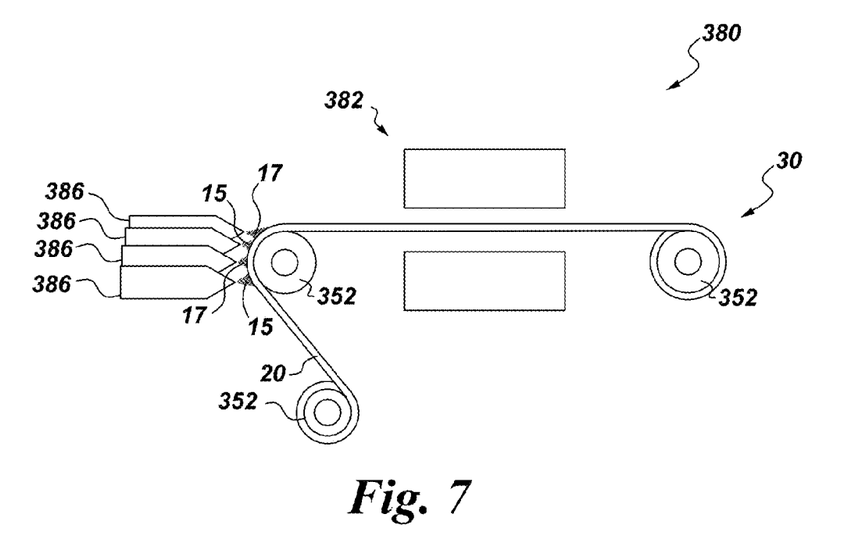
FIG. 7 is a schematic diagram of a system that employs a method of manufacture of a stacked film threshold component, according to another embodiment of the present invention.
Figure 10:
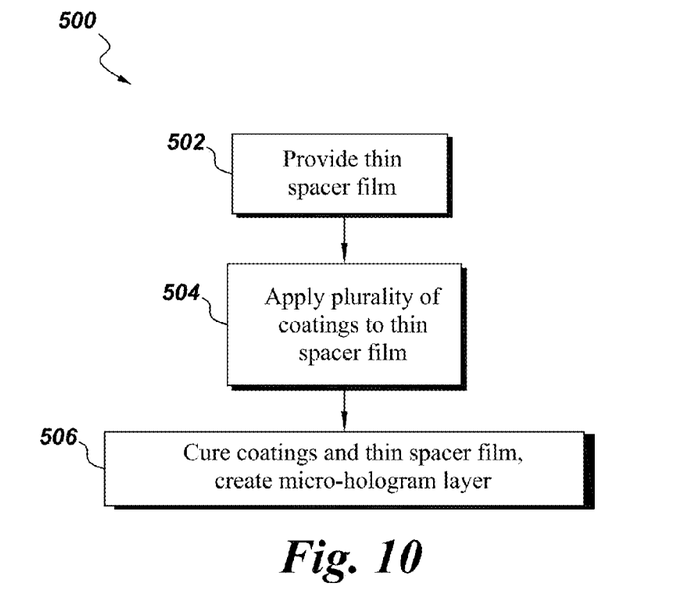
FIG. 10 is a flowchart of another method of manufacturing a stacked film threshold component, according to another embodiment of the present invention.

Referring to FIG. 7, a schematic diagram of a system that employs a method of manufacture of a component 30, according to another embodiment of the present invention, is shown. A flowchart depicting the method of manufacture of the component 30 that the system in FIG. 7 may use is shown in FIG. 10 as 500. The system 380 may employ a roll-to-roll system that includes rollers 352 and a plurality of other elements (not shown) that are suitable so as to provide a component 30. The system 380 further comprises a plurality of coating devices 386 for configured to dispense and apply a plurality of coatings.

The method 500 comprises providing a thin spacer film 20 at 502, via a roll-to-roll system. The thin spacer film 20 receives from the plurality of coating devices 386 an application of a plurality of coatings 15, 17 at 504. The plurality of coatings 15, 17 comprise an inert material coating 17 alternated with a functional material coating 15 wherein the functional material coating comprises a material that undergoes a change in its refractive index when illuminated by a first light beam and undergoes no change in its refractive index when illuminated by a second light beam. In this manner, interleaved or alternating coatings of inert material 17 and functional material 15 may be applied to the spacer film 20.

At 506 the thin spacer film 20 and plurality of coatings 15, 17 thereon are cured by a curing device 382 thereby creating a component, 30. In this manner multiple components 30 having micro-hologram layers 10 and spacers 20 may be created.

In another embodiment, these plurality of components 30 may be transported and aligned, via similar means (e.g., roll-to-roll systems) as those discussed with regards to the systems and methods depicted in FIGS. 6 and 8. The aligned plurality of unit hologram and spacer film structures, or components, may be adhered to each other thereby forming a component. Other film process steps in the method may include surface cleaning, treatment before coating, adding/removing protective masking films, and the like.

The coating device 386 may be any suitable device for applying any suitable functional film coatings 15, 17 including, but not limited to, a slot-die coating, a slide coating, curtain coating, gravure coating, and the like. Similarly, the curing provided by the curing device 382 may be by any suitable means including, but not limited to, heating, ultraviolet curing, and the like. As with the other data storage devices constructed, other steps in the method may include, for example, adhering the stacked film structure to one or more substrate layers, cutting the device to a predefined size and shape, and/or applying various coatings as discussed herein.

In another embodiment, the plurality of functional films 12 used in the micro-hologram layers 10 may comprise any suitable combination of polymers, non-linear optical dyes, sensitizers, and material capable of undergoing a refractive index change. Various types of functional films 12 and inert layers 14 may be used in the data storage device 100 depicted. Different micro-hologram layers 10 may have different refractive indices, depending on the construct of the particular micro-hologram layer 10 and spacer film 20. For example, the component 30 may be constructed such that a top micro-hologram layer 10 (e.g., closest to a read or write device) has the lowest refractive index. The next down micro-hologram layer 10 has a higher refractive index than the top micro-hologram layer 10, and so forth. Thus, the lowest micro-hologram layer 10 of the component 30 may have the highest refractive index. In this manner, the component 30 becomes progressively more reflective through the component 30 when moving away from the read or write device.

While the embodiments illustrated and described herein may be used for a micro-holographic disc, other optical data storage devices may employ aspects of the present invention without departing from the scope of the invention. For example, the data storage device may be a multi-photon storage such as 2-photon storage, and the like.

Further, while embodiments illustrated and described herein may be used in the area of data storage and retrieval, aspects of the invention are not limited as such. The components, devices incorporating said components, and methods of manufacture may be used in other technical areas and for other technical endeavors.

Therefore, according to one embodiment of the present invention, a component comprises a micro-hologram layer, wherein the micro-hologram layer comprises a plurality of layers inert to light interleaved with a plurality of functional film layers, wherein the plurality of functional film layers comprise a material that undergoes a change in its refractive index when illuminated by a first light beam and undergoes no change in its refractive index when illuminated by a second light beam.

In accordance with another aspect of the invention, a method of manufacture comprises providing a functional film material that undergoes a change in its refractive index when illuminated by a first light beam and undergoes no change in its refractive index when illuminated by a second light beam; providing a material inert to light; extruding the functional film material and the material inert to light through a multi-plier die, thereby forming a micro-hologram layer; providing a spacer film; and adhering the spacer film and the micro-hologram layer, thereby forming a component.

According to another embodiment of the present invention, a method of manufacture comprises: providing a thin spacer film, via a roll-to-roll system; applying a plurality of coatings to the thin spacer film, wherein the plurality of coatings comprise: a functional material that undergoes a change in its refractive index when illuminated by a first light beam and undergoes no change in its refractive index when illuminated by a second light beam; and an inert material; curing the thin spacer film and the plurality of coatings thereby creating a micro-hologram layer.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A component comprising:
a micro-hologram layer, wherein the micro-hologram layer comprises a plurality of layers inert to light interleaved with a plurality of functional film layers, wherein the plurality of functional film layers comprise a material that undergoes a change in its refractive index when illuminated by a first light beam and undergoes no change in its refractive index when illuminated by a second light beam; and
a plurality of spacer films interleaved with the micro-hologram layer, wherein a first micro-hologram layer and a second micro-hologram layer respond to two different wavelengths during readout.

2. The component of claim 1, wherein the plurality of spacer films are inert to light.

3. The component of claim 1, wherein the plurality of spacer films have a thickness from about 20× to about 100× of Rayleigh range.

4. The component of claim 1, wherein a first spacer film has a different thickness than a second spacer film.

5. The component of claim 1, wherein a period of the micro-hologram layer is defined as P, wherein $$P = \lambda/2n$$

further wherein $\lambda$ is a light wavelength of a readout light beam and n is an effective refractive index of the plurality of layers inert to light and functional film layers in a micro-hologram layer.

6. The component of claim 1, wherein a thickness of a micro-hologram layer is in a range from about 0.5 μm to about 10 μm.

7. The component of claim 1, wherein an absolute index change is in a range from about 0.001 to about 0.05.

8. The component of claim 1, wherein a reflectivity of the micro-hologram layer is changed, when illuminated with high intensity light during a recording condition.

9. The component of claim 1, wherein a quantity of micro-hologram layers is in a range from 2 to 50.

10. The component of claim 1, wherein a thickness of the data storage device component is in a range from about 20 μm to about 500 μm.

11. The component of claim 1, wherein the plurality of layers inert to light and the plurality of spacer layers have a same refractive index.

12. The component of claim 1, wherein a first material in a first functional film layer has a first material composition, concentration, and threshold response and a second functional film layer has a second material having at least one different second material composition, concentration, and threshold response.

13. The component of claim 1, wherein the component comprises multiple successive micro-hologram layers, wherein each successive micro-hologram layer has a higher reflectivity in a direction moving further from one of a data reader and a read/write device.

14. The component of claim 1, wherein at least one of the plurality of spacer films further comprise an auxiliary reflective stack, said auxiliary reflective stack comprises a plurality of layers comprised of materials inert to recording and readout light wavelengths, thereby defining a reflecting reference layer.

15. The component of claim 1, wherein the first micro-hologram layer is adjacent the second micro-hologram layer.

16. The component of claim 15, wherein the first micro-hologram layer and the second micro-hologram layer are alternating through the component.

17. The component of claim 1, wherein a recording wavelength of the plurality of micro-hologram layers is different than a readout wavelength of the plurality of micro-hologram layers.

18. The component of claim 1, wherein the first light beam comprises light having a high intensity and the second light beam comprises light having a low intensity.

19. A data storage device comprising:
    a substrate layer comprising a moldable non-photopolymer plastic substrate and a servo layer therein; and
    the component of claim 1 adjoining the substrate layer.

20. The data storage device of claim 19, wherein a shape of the data storage device is one of a disc, square, and rectangle.

21. A component of claim 1, further wherein the component is configured for data storage use.

* * * * *

UNITED STATES PATENT AND TRADEMARK OFFICE
CERTIFICATE OF CORRECTION

PATENT NO.        : 8,830,548 B2                                      Page 1 of 1
APPLICATION NO.   : 13/563194
DATED             : September 9, 2014
INVENTOR(S)       : Shi et al.

It is certified that error appears in the above-identified patent and that said Letters Patent is hereby corrected as shown below:

IN THE DRAWINGS:

In Fig. 9, Sheet 6 of 6, for Tag "406", in Line 2, delete "multipier" and insert -- multiplier --, therefor.

IN THE SPECIFICATION:

In Column 6, Line 23, delete "data storage device 10" and insert -- data storage device 100 --, therefor.

IN THE CLAIMS:

In Column 14, Line 17, in Claim 21, delete "A component" and insert -- The component --, therefor.

Signed and Sealed this
Sixteenth Day of December, 2014

Michelle K. Lee
*Deputy Director of the United States Patent and Trademark Office*